(12) United States Patent
de Nora et al.

(10) Patent No.: US 6,228,424 B1
(45) Date of Patent: May 8, 2001

(54) METHOD AND APPARATUS FOR IMPREGNATION OF POROUS BODIES FOR PROTECTION AGAINST OXIDATION

(75) Inventors: Vittorio de Nora, Nassau (BS); Jean-Jacques Duruz, Geneva; Georges Berclaz, Veyras, both of (CH)

(73) Assignee: Moltech Invent S.A., Luxembourg (LU)

(*) Notice: Subject to any disclaimer, the term of this patent is extended or adjusted under 35 U.S.C. 154(b) by 0 days.

(21) Appl. No.: 09/101,417
(22) PCT Filed: Jan. 9, 1997
(86) PCT No.: PCT/IB97/00008
§ 371 Date: Dec. 10, 1998
§ 102(e) Date: Dec. 10, 1998
(87) PCT Pub. No.: WO97/26226
PCT Pub. Date: Jul. 24, 1997

(51) Int. Cl.[7] .............................. B05D 5/00; C23C 14/00
(52) U.S. Cl. ............................ 427/243; 118/50; 118/64; 205/109; 205/161; 427/113; 427/180; 427/294
(58) Field of Search ........................... 205/109, 161; 427/113, 243, 180, 294; 118/50, 64

(56) References Cited

U.S. PATENT DOCUMENTS

| | | | |
|---|---|---|---|
| 1,818,976 | * 8/1931 | Goff. | |
| 2,290,671 | * 7/1942 | Camilli et al. | 175/21 |
| 3,084,662 | * 4/1963 | Badger | 118/50 |
| 3,104,987 | * 9/1963 | Jackson, Jr. | 118/50 |
| 3,900,866 | * 8/1975 | Bell et al. | 118/50 |
| 4,038,939 | * 8/1977 | Hoyer et al. | 118/50 |
| 4,191,126 | * 3/1980 | Reed et al. | 118/50 |
| 4,384,014 | * 5/1983 | Young | 118/50 |
| 4,454,193 | * 6/1984 | Block | 427/113 |
| 4,559,193 | * 12/1985 | Ogawa et al. | 264/60 |
| 4,609,563 | * 9/1986 | Shimrock et al. | 118/50 |
| 5,022,343 | * 6/1991 | Fujikawa et al. | 118/50 |
| 5,286,294 | * 2/1994 | Ebi et al. | 118/50 |
| 5,534,130 | * 7/1996 | Sekhar | 427/113 |
| 5,578,174 | * 11/1996 | Sekhar | 427/113 |
| 5,651,874 | * 7/1997 | De Nora et al. | 427/78 |
| 5,753,382 | * 5/1998 | Sekhar et al. | 427/113 |
| 5,866,210 | * 2/1999 | Rosynksy et al. | 118/50 |

* cited by examiner

Primary Examiner—Shrive Beck
Assistant Examiner—Paul D. Strain
(74) Attorney, Agent, or Firm—Jayadeep R. Deshmukh (57) ABSTRACT

An open-pored body (11), in particular a carbon component of an aluminum production cell, which is to be exposed to oxidizing conditions or chemical attack at high temperatures is treated to protect the body against oxidation or corrosion at high temperature by impregnating the surface of the body at about ambient temperature with a hot non-saturated liquid (10). This liquid contains a treating agent at a temperature above the temperature of the body. The concentration of treating agent in the hot liquid is such that when the liquid is cooled, before it reaches the temperature of the body, the liquid saturates and treating agent precipitates. A pressure differential is applied to cause the liquid to impregnate into the surface pores of the body (11) and precipitate a layer of the treating agent from the liquid inside the body by cooling as it impregnates the pores of the body. The treating solution preferably comprises soluble boron compounds and, when the body is exposed to high temperature oxidizing conditions, the precipitated layer of the treating agent inside the body forms a protective, vitreous layer in the surface pores which protects the body against oxidation.

37 Claims, 2 Drawing Sheets

METHOD AND APPARATUS FOR IMPREGNATION OF POROUS BODIES FOR PROTECTION AGAINST OXIDATION

FIELD OF THE INVENTION

The invention relates generally to a method of treating open-pored porous bodies which are to be exposed to oxidising conditions at high temperatures so as to protect the bodies against oxidation or other chemical attack in said high temperature oxidising conditions, in particular the treatment of prebaked carbon components of aluminium production cells, such as anode blocks or cathode blocks or cell side walls.

The invention also relates to an apparatus for carrying out this method and use of the apparatus for applying a treating liquid to a prebaked carbon component of an aluminium production cell.

BACKGROUND OF THE INVENTION

The treatment of prebaked carbon components of aluminium production cells, such as anode blocks, cathode blocks or cell sidewalls to improve their resistance to the conditions prevailing in the cell has already been proposed.

U.S. Pat. No. 5,486,278 (Manganiello et al) discloses treating a prebaked carbon-based anode of an electrolytic cell for the production of aluminium, in particular by the electrolysis of alumina in a molten fluoride electrolyte, over its sides and top to improve the resistance thereof to erosion and corrosion during operation of the cell by air and oxidising gases released at the anode, by immersing the anode in a boron-containing solution containing 5–60 weight % of $H_3BO_3$ or $B_2O_3$ in methanol, ethylene glycol, glycerin or water with a surface-active agent, e.g. at 80° to 120° C. After immersion, lasting up to an hour, the boron-containing solution is impregnated to a depth of usually about 2–5 cm over the top and side surfaces of the anode to be protected, producing a concentration of boron in the impregnated surface from 100 ppm to 0.35%. The same treatment can be applied to cell sidewalls.

It was found advantageous to carry out this treatment with a heated solution, but this involved heating of the anode, which consumed large quantities of energy. Attempts were therefore made to carry out the process at ambient temperature because no special heating equipment would be required. Low temperature application however required the careful choice of solvents and surfactant agents in order to reduce the treatment time as far as possible.

For prebaked anodes, only the top and top side surfaces need to be protected, so it was suggested to dip the anode upside down into the solution. But this is impractical when the anodes are fitted with rods for connection to a suspension device which also serves as a current lead-in. Furthermore, it is inconvenient to treat the anodes first and then fix the suspension rods.

To overcome this difficulty it would be possible to dip the anode in the treating solution with the rodded top side up, and protect the bottom part of the anode by blocking its pores with a fugitive agent that prevents impregnation with the boron-containing compound, and can be removed afterwards. This however entails additional operations and careful selection of the fugitive agent.

To speed up the process, it was suggested to assist the impregnation by the application of a pressure differential, by pressure or vacuum. However, no practical way of doing this was disclosed.

U.S. Pat. No. 5,534,130 (Sekhar) describes the protection of the cell sidewalls of aluminium production cells by impregnating them with agents based on aluminium phosphate. Again, it would be desirable to perfect ways of applying this method in an efficient manner.

SUMMARY OF THE INVENTION

It is an object of the invention to obviate the above-described problems and shortcomings of the available methods and apparatus.

It is another object of the invention to provide a method of treating an open-pored porous body which is to be exposed to oxidising conditions at high temperatures so as to protect the body against oxidation or chemical attack in said high temperature condition, in particular carbon components of aluminium production cells such as anode blocks without necessarily pre-heating the anode blocks or other bodies, while assuring an effective impregnation of the treating liquid into the pores of the treated part, and enabling the treatment of large numbers of the bodies in an efficient manner.

A particular object of the invention is to provide a method which can use a hot treating liquid in a very efficient manner, without necessarily heating the treated body substantially above ambient temperatures.

In general terms, the invention provides a method of impregnating an open-pored porous body with a hot treating liquid containing a dissolved treating agent to produce within the body a protective layer to a desired depth. This method comprises impregnating a hot non-saturated treating liquid into the surface of the porous body assisted by the application of a pressure differential. The applied treating liquid is at a temperature above that of the body and the concentration of the treating agent in the applied liquid is such that cooling of the applied liquid as it impregnates the pores of the body causes precipitation of the treating agent in the pores to the desired depth.

More specifically, the method according to the invention comprises firstly bringing the surface of the body into contact with a hot liquid containing a dissolved treating agent at a concentration below saturation and at a temperature well above the temperature of the body. The concentration of treating agent in the hot liquid is such that when the liquid is cooled down to the temperature of the body the liquid saturates and treating agent precipitates.

A pressure differential is then applied to cause the hot non-saturated treating liquid contacting the body to impregnate into the surface pores of the body. As the treating liquid impregnates the pores of the body, it cools and deposits, within pores of the body underneath the surface, a layer of the treating agent precipitated from the impregnation liquid. Some treating agent may also cover the outside of the body's surface.

When, later, during use, the body is exposed to high temperatures particularly under oxidising conditions, this layer of the treating agent precipitated inside the body underneath its surface forms a protective layer in the surface pores which protects the body against oxidation or other chemical attack. Advantageously, the treating agent contains a soluble boron compound which forms an impervious viscous protective layer which is self forming above about 400° C.

The treating liquid in contact with the body is usually at least 5° C. and in many cases at least 10° C. above the temperature at which the treating liquid is saturated with the dissolved treating agent for its given concentration.

Moreover, the treating liquid is at a temperature well above that of the body to be treated, i.e. usually at least 20° C. above and conveniently 40° C. or more above. For example the treating liquid is at a temperature in the range 60° to 120° C., whereas the body can be at ambient temperature or just above, say from about 20° C. to 50° C. The applied treating liquid which is in contact with the body can be maintained at a more-or-less constant temperature by heating it to compensate for heat loss due to contact of the treating liquid with the body.

The treating time can be reduced to a few minutes, which is a great improvement over the previous impregnation techniques.

There is no need to heat the body to be treated which makes the method energy efficient.

The method permits treatment of only a selected part of the body, in particular by using a specially designed apparatus, described below.

Due to the rapidity of the impregnation process, the treated anode or other body only takes up a small quantity of heat, so the process is very energy efficient.

The treated carbon bodies typically have an overall porosity in the range 20–24%, of which about 10–12% is open porosity. The penetration depth can be of the order of 0.5 to 3 cm. However, the treating agent may also extend to and even cover the bodies' outer surface.

In one embodiment of the method, treating liquid is circulated by the following arrangement. Hot treating liquid is supplied from a reservoir and, after treatment of the body, non-impregnated treating liquid is returned back to the reservoir. The treating liquid in the reservoir is stirred and heated to maintain a desired temperature. Components of the treating liquid (the dissolved treating agent; possible further materials in suspension and water) can be added to the reservoir to compensate for consumption of the treating liquid in the treating process.

Another inventive aspect is a method of supplying the treating liquid which comprises providing a saturated solution of the treating agent at a given temperature, and deriving, from said saturated solution, a non-saturated solution of the treating agent. The non-saturated treating solution is then supplied as the treating liquid to treat the body.

For example, the non-saturated solution is obtained by increasing the temperature of the solution. In this way, the non-saturated solution contains the treating agent at the same concentration as the saturated solution (which corresponds to the saturation concentration at said given temperature) but is simply at a higher temperature.

The treating liquid preferably contains an oxidation retardant agent for impregnating the part of the body to be treated, in particular at least one soluble compound of boron and/or phosphorous for improving the resistance to oxidation of the carbon.

Preferred oxidation retardant agents for application to aluminium production anodes are boron containing liquids based on $B_2O_3$, boric acid, tetraboric acid, salts of said acids or boron silicate. These boron containing agents such as $B_2O_3$ act as catalytic oxygen inhibitors when impregnated/dispersed in carbon. However, when they are densely applied they form a vitreous impervious layer in the surface pores at temperatures above about 400° C. Such a layer acts as a barrier to protect the pores of a carbon body from oxidation. Such viscous layers act mainly by a barrier effect to inhibit oxidation. This is different to the effect of deeply impregnated boron compounds whose effect is principally as an anti-catalyst.

Various silicon containing compounds, in particular boron silicate and silica are also suitable for producing viscous protective layers at the operating temperatures, especially in combination with boron compounds where an excess of the boron compound (in particular boric acid) will lead to the formation of borosilicate glass. Though the silicon compounds alone are not effective against oxidation and provide no anti-catlytic effect, when combined with boron compounds the resulting glassy material provides improved protection.

Alternative treating liquids, specially suitable for protecting cell side walls, are liquids based on phosphates of aluminium for example selected from the group consisting of monoaluminium phosphate, aluminium phosphate, aluminium polyphosphate, aluminium metaphosphate, and mixtures thereof.

The boron, phosphorous and/or silicon-containing treating liquids can contain surfactants surfactant agents in particular tensio-active cationic agents. Anionic tensio-active agents can also be used. Such agents should be devoid of components that would undesirably contaminate the aluminium produced and components that promote oxidation of the carbon. These surface-active agents may possibly be present together with other solubility improving agents such as tartaric acid or citric acid, and the liquid may be heated to improve and to speed up the impregnation of the anode.

When water is chosen as solvent, a surfactant such as those available under the tradenames NONIDET P 40 and SPAN 85, from Fluka, and GLUCOPON 225, DEHYPON LS, QUAFIN LDM and QUAFIN CT, from Henkel, can be used in order to achieve an acceptable low treatment time. However, this is not essential.

Optionally, treatment with the treating liquid may be combined with the application of a suspension containing particles which block the surface pores of the body and form a surface coating, or the treatment may be followed by the application of a suspension containing particles which help reduce the pore size. Such a suspension may contain a colloid selected from colloidal alumina, silica, yttria, ceria, thoria, zirconia, magnesia, lithia, monoaluminium phosphate or cerium acetate, or particles of the same materials.

For certain applications, for example for treating the surface of cathode blocks, this impregnation or top coating liquid may contain particulate refractory boride, such as $TiB_2$, and/or aluminium powder, chips or cuttings.

A very advantageous treating liquid further contains fine carbon powder which helps keep the pores blocked and helps prevent migration of the oxidation retardant agent (which becomes viscous at the operating temperatures) towards the bottom of the impregnated component.

Thus, the term "treating liquid" should be understood as including non-saturated solutions of the treating agent and "quasi-solutions". In addition to the dissolved treating agent at below-saturation concentration forming a true homogeneous solution, "quasi-solutions" further comprise components such as colloids and particles in suspension.

In all cases, when the treating solution is deposited in the pores of the treated body, the dissolved treating agent precipitates. Later, when the body is heated, removal of water will lead to a continuous protective barrier layer substantially impervious to oxygen. For this, an adequate amount of the treating agent must be deposited in the pores, which can precisely be achieved with the method according to the invention. Furthermore, to improve the action of closing of the pores by the precipitated treating material, the treating solution advantageously further comprises the above-mentioned suspensions or powders.

For bodies which are exposed to uneven wear over different parts of their surface due to different oxidising conditions, for example prebaked carbon anodes or cell sidewalls of aluminium production cells, it is possible to apply different treatments to different areas in order to optimize the protective effect against oxidation and in order to minimize the amount of oxidation retardant used. For example, it is possible to impregnate practically the entire sides of anodes with a dilute liquid of an oxidation retardant, as described in the aforementioned U.S. Pat. No. 5,486,278, followed by applying a surface layer in accordance with this invention only over the "top and shoulders" of the anode that will be recovered as the anode butt. Or the "top and shoulders" could be further protected by applying a top coating including inert particles.

Where special problems of oxidation occur, it is also possible to further top coat or spray with a slurry for example of boric acid or another protective material.

In a modified method, the surface of the body can first be impregnated to a depth of several centimeters by impregnation with a "dilute" solution of the treating agent, followed by a treatment according to the invention with a near-saturated solution which precipitates into the surface pores.

The treated body may be a pre-baked anode of an aluminium production cell, which anode is rodded, i.e. has a rod attached to its top face for connection of the anode to a suspension device which also serves as a current lead-in. Using the method of the invention and the described apparatus, rodded anodes can easily be treated with their rodded side up, which greatly facilitates handling.

When preformed carbon anodes are put into service in aluminium production cells, their bottom part immersed in the electrolyte is at a temperature usually about 960° C., whereas their top part exposed to oxidising gases is initially at a temperature of about 450–500° C., but which rises to 700° C. or more as the anode is consumed.

By protecting the top parts of the anodes in accordance with the invention with a boron-containing liquid, at the operating temperature this liquid loses water and forms a highly viscous non-solid coating in the surface pores of the top part of the anode to be protected. This viscous layer self-forms in the operating conditions and considerably reduces wear of the top part of the anode by oxidation. As a result, the anode butts remaining at the end of the anodes useful life are considerably more intact than those of non-protected anodes, or anodes protected by prior art methods.

The treated body may alternatively be part of a sidewall of an aluminium production cell, or a cathode block of an aluminium production cell.

The method of the invention can advantageously be carried out in a specially developed apparatus for applying a treating liquid to an open-pored porous body. Such apparatus comprises a treating chamber having at least one sealing member which is arranged to be applied to a body to be treated which is placed in the treating chamber. The sealing member or members is/are arranged so as to isolate an upper part of the treating chamber around the part of the body to be treated from a lower part of the treating chamber around a bottom part of the body which is not to be treated.

The apparatus also includes a reservoir containing a supply of hot non-saturated treating solution of a treating agent at a temperature above the temperature of the body to be treated. The concentration of treating agent in the hot solution is such that when the solution is cooled, before it reaches the temperature of the body, the solution will saturate so that treating agent precipitates.

Means are provided for filling the upper part of the treating chamber with a treating liquid to cover the part of the body to be treated. These means can include a pump for pumping treating liquid from a supply reservoir.

Means are also provided for applying a pressure differential to intake an amount of the treating liquid into pores in the part of the body to be treated, in particular by applying a vacuum to the lower part of the treating chamber.

Lastly, means are provided for removing remaining treating liquid, which has not been absorbed by the body during the treatment, from the treating chamber. These means can include another pump for pumping residual treating liquid back to the supply reservoir.

Further details of an advantageous apparatus are described in PCT application PCT/IB97/---- concurrently filed herewith (Ref. MOL0546-03).

In the method of the invention, a hot treatment liquid is to be used to treat bodies at ambient temperature. For this, the treating chamber can be provided with means for heating the treating liquid in the upper part of the treating chamber to compensate for heat loss due to contact of the liquid with the body. Other arrangements to achieve a thermal balance can be used, as appropriate.

An embodiment of the apparatus comprises a reservoir for treating liquid, from which hot treating liquid is supplied to the top part of the treating chamber and to which remaining treating liquid, which has not been absorbed by the body during the treatment, is returned from the upper part of the treating chamber. This reservoir comprises means for heating and means for stirring the treating liquid therein. A metering device can be provided for adding components of the treating liquid to the reservoir to compensate for consumption of the treating liquid in the treating process.

A preferred storage vessel or reservoir—which can be used for various treatments—comprises first and second compartments, the first compartment containing a reserve supply of the hot treating liquid in contact with a mass of the treating agent at a given temperature $T_1$. In the first compartment, the treating agent is dissolved at a concentration which corresponds to the saturation concentration, at temperature $T_1$. The second compartment contains a supply of non-saturated treating liquid in which the treating agent is dissolved at the same concentration but at a temperature $T_2$ above temperature $T_1$, or at the same temperature $T_1$ but a lower concentration. The vessel further comprises: means for maintaining the hot treating liquid in each of the first and second compartments at the respective temperature; an outlet conduit for supplying the non-saturated hot treating liquid from the second compartment of the vessel to treat a body or material; and a conduit for supplying hot treating liquid from the first compartment to the second compartment to compensate for consumption/loss of the treating liquid by treatment of the body or material.

The apparatus preferably comprises means for applying heat to treating liquid in the upper part of the treating chamber to compensate for cooling of the liquid by contact with the body.

An advantage of the above-outlined method and apparatus is that it is possible to treat large bodies such as prebaked anodes without a need to pre-heat them. However, the bodies can be pre-heated if required, to just above ambient temperature. In particular, it can be useful to locally pre-heat the top part of the bodies to be treated, while maintaining a sufficient temperature differential with the treating liquid.

Another advantage is that the method and apparatus allow sequential treatments to be carried out on the top part of the same body, over the same area or over a different area, using the same treating liquid or different treating liquids/slurries.

DETAILED DESCRIPTION OF THE INVENTION

Figure 1:
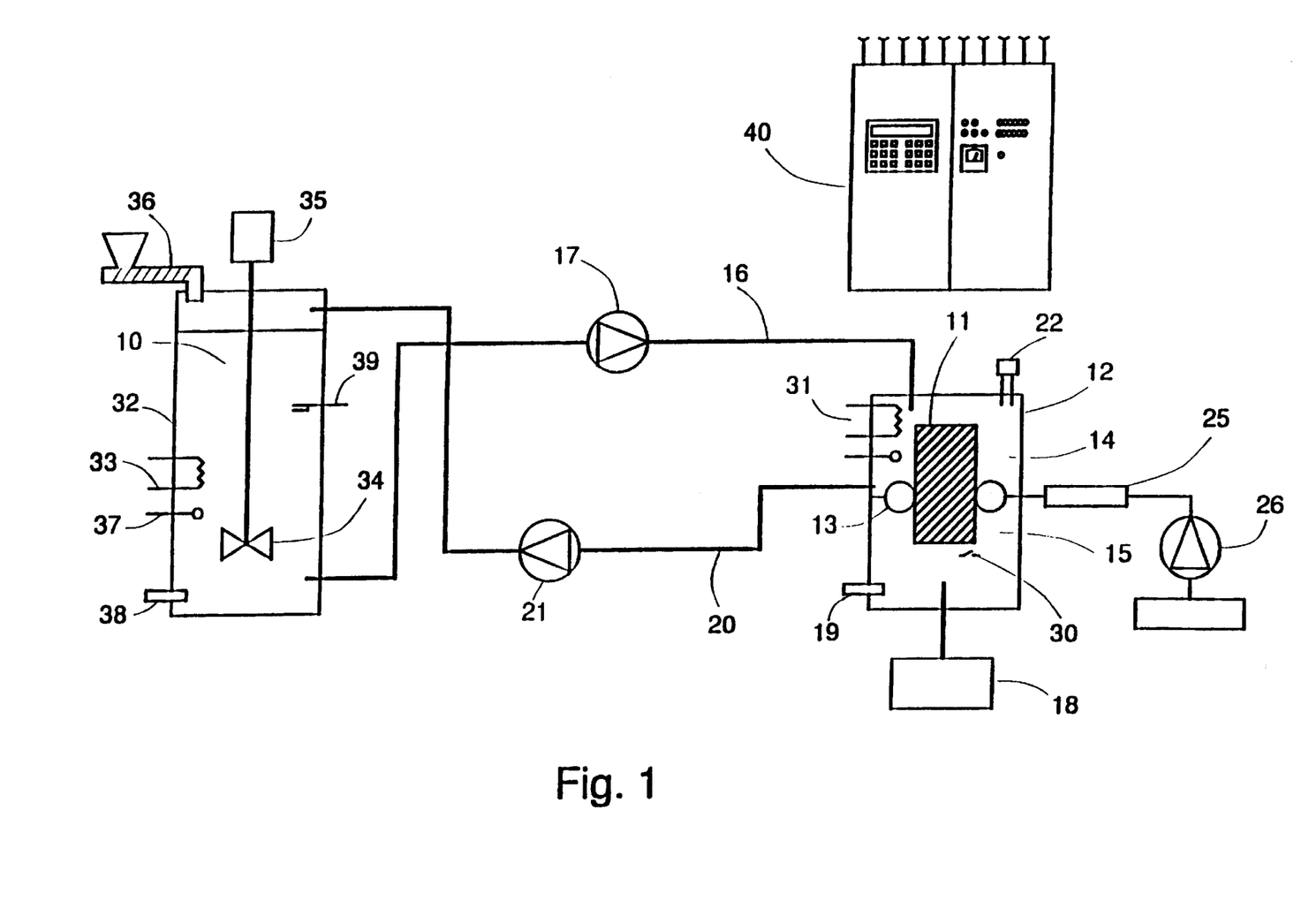
FIG. 1 is a schematic diagram of an apparatus for carrying out the method according to the invention.

FIG. 1 schematically shows an apparatus for applying a treating liquid 10 to a porous body 11 by the method of the invention. The apparatus comprises a treating chamber 12 having an upper part 14 and a lower part 15. The upper part 14 is open-topped and may be provided with a removable cover or lid.

A sealing member 13 consisting of several sections of elastomeric material is arranged to surround a body 11 to be treated when the body is placed in the treating chamber 12 by inserting it into the open top by means of an automatic handling device (not shown). In the case of square or rectangular bodies 11 such as prebaked carbon anodes of aluminium production cells, four sections of elastomeric material can be arranged around the four sides, each section being associated with a series of hydraulic, pneumatic or mechanically actuated cylinders, one such hydraulic cylinder 25 being shown in FIG. 1.

This sealing member 13, when it is tightened around the body 11, isolates a space in the upper part 14 of the treating chamber around the part of the body 11 to be treated, from a lower part 15 of the treating chamber around a bottom part of the body 11 which is not to be treated.

Isolation of the upper and lower parts 14, 15 of chamber 12 can be achieved by means of a flexible skirt associated with the sections of the sealing member 13, or by arranging the sections of the sealing member 13 to fluid-tightly protrude from a groove or the like around the chamber wall.

A supply conduit 16 for treating liquid leads into the upper part 14 of the treating chamber. Conduit 16 leads from a reservoir 32 of treating liquid 10 and has a supply pump 17 by means of which treating liquid 10 can be supplied to the upper part 14 of the treating chamber so as to cover the part of the body 11 to be treated, up to a level determined by a sensor 22.

A Venturi or vacuum pump 18 is connected to the lower part 15 of chamber 12 for evacuating the space around the underside of the body 11. When the Venturi or vacuum pump 18 is switched on, air filling the pores of body 11 is evacuated, which causes an amount of the treating liquid 10 in the upper part 14 of chamber 12 to be intaken into the part of the body 11 to be treated. A pressure detector 19 is provided in the lower part 15 of chamber 12. This detector 19 is sensitive to the change in pressure which occurs when all of the pores of the part of body 11 being treated are filled.

An outlet conduit 20 is connected to the bottom of the upper part 14 of the chamber. This conduit 20 leads back to the reservoir 32 and has a pump 21 for returning treating liquid remaining in the chamber at the end of treatment of a body 11 back to the reservoir 32.

A hydraulic system, comprising a hydraulic cylinder 25 controlled by a hydraulic pump 26, is provided for adjusting the sealing member 13 which is connected to a piston of the hydraulic pump 26. When this piston is pulled into its cylinder 25, the member 13 is pulled out to allow a loose fit around a body 11, permitting insertion and removal of the body 11 into or from the treating chamber 12. When the piston is pushed out of its cylinder 25, the sealing member 13 is tightened around the body 11 to provide a sealing fit, by elastic deformation of the elastomeric material making up the sections of sealing member 13 when they are applied against the body 11 under the pressure applied by the hydraulic control.

Alternatively, it is possible to control the sealing member 13 pneumatically, mechanically or electro-mechanically.

A position detector 30 is provided in the lower part 15 of the treating chamber for detecting when a body 11 introduced into chamber 12 reaches a predetermined position. This position depends on the size of the body 11 and corresponds to the level of the bottom of the body 11 when the top of the body to be treated is at a level where it will be covered by treating liquid 10 in the upper part 14 of the chamber. The detector 30 is arranged to actuate the hydraulic pump 26 and hydraulic cylinder 25 to bring the sealing member 13 to sealably engage with the body 11 when the body 11 has reached the given position.

The treating chamber 12 comprises a heater 31 for heating the treating liquid 10 in the upper part 14 of chamber 12. The heater 31 can be an electric heater or can operate by circulating hot air or another heating fluid. This heater 31 can be adjusted to supply an amount of heat which compensates for heat loss due to contact of liquid 10 with body 11, i.e. depending on the size and temperature of the body 11 and its thermal characteristics, and the operating temperature of the treating liquid 10. If required, the heater 31 can be replaced by means for maintaining a proper thermal balance.

The reservoir 32 supplies hot treating liquid 10 to the top part 14 of the treating chamber and, after the end of the treatment of a body 11, treating liquid remaining is returned to the reservoir 32 via conduit 20. The reservoir 32 is externally insulated and is fitted with a heater 33 for maintaining the treating liquid 10 at a selected temperature controlled by a thermostat 37. A stirrer 34 constantly or intermittently driven by a motor 35 stirs the treating liquid 10 contained in reservoir 32. In the embodiment shown in FIG. 1, at the top of reservoir 32 is a metering device 36 for adding components of the treating liquid 10 to the reservoir 32 in an amount to compensate for consumption of the treating liquid 10 in the treating process. The reservoir 32 also includes a pressure sensor 38 for monitoring the level of liquid 10 and a sensor 39 measuring the density or the conductivity of liquid 10, serving to control the metering device 36.

The treating liquid 10 in reservoir 32 is maintained at a selected temperature, say from 60° C. to 120° C. and contains a treating agent at a concentration well below saturation. An advantageous reservoir for maintaining a supply of non-saturated treating liquid is described below with reference to FIG. 2.

A preferred apparatus comprises a control panel schematically indicated at 40. This control panel includes controls for all routine adjustments such as temperature of the liquid in reservoir 32 and in the top part 14 of chamber 12, the liquid level to be controlled by sensor 22, etc. The control panel also includes an overall control arranged to sequentially perform the following operations:

First, the sealing member 13 is actuated (by the position detector 30 and hydraulic control 26/25) to sealably engage with the body 11 when the body 11 to be treated has reached the given position.

Next, the pump 17 is switched on to fill the upper part 14 of the treating chamber 12 with a quantity of hot treating liquid 10 from the reservoir 32, up to a level controlled by sensor 22.

Then, the lower part 15 of the treating chamber is evacuated by switching on the Venturi or vacuum pump 18, which evacuates air from the pores of body 11 and intakes treating liquid 10 into the surface pores.

During the vacuum treatment, if required the heater 31 is switched on to heat the treating liquid 10 in the upper part 14 of the chamber 12 in order to compensate for cooling of the liquid 10 by contact with body 11, so that the treating liquid 10 in contact with the body 11 remains at more-or-less constant temperature above the saturation temperature. In this way, the treating liquid in the circulation system is always maintained non-saturated, thereby avoiding unwanted deposits of the treating agent in the circulation system.

When the vacuum is applied, hot treating liquid is intaken into the pores of body 11 which, for example, is at ambient temperature. As it is intaken into the pores, the treating liquid heats the surface part of body 11, whereas the temperature of the impregnated treating liquid drops. As the pores fill with treating liquid, the deeper the liquid penetrates the cooler it becomes until it deposits precipitated treating agent firstly in some pores. The liquid is then diverted to fill those pores which still remain open. When all pores are full and blocked by deposited treating agent, the impregnation is sufficient and this is signaled by the pressure detector 19, which immediately or after a given time automatically switches off the Venturi or vacuum pump 18 and then actuates pump 21 to remove residual treating liquid 10 from the upper part 14 of the treating chamber.

When all of the residual liquid 10 has been removed from the upper part 14 of the treating chamber, the hydraulic pump 26 is actuated to release the sealing member 13 and allow removal of the treated body 11 from the treating chamber 12 by an automatic handling device (not shown).

A typical body 11 to be treated is a prebaked carbon anode of an aluminium production cell. Such bodies usually have a porosity of about 20–24%, of which 10–12% is open porosity. A prebaked anode may weigh of the order of 1000 kg. Attached to its upper side of the anode is a steel rod for connection to a suspension device and which also serves as an electrical connection.

The treatment of prebaked anodes by known impregnation processes is difficult (because of the attached rod) and energy consuming (because of the need to heat the entire anode to a temperature at which the impregnation process will be effective).

With the method according to the invention, the treatment of prebaked anodes is advantageous, because the anode can be treated with its rodded side up and only the part which needs to be treated (the upper side shoulders and top) can be treated without preheating of the anode, in a simple treatment with the anode at ambient temperature and the treating liquid at a convenient temperature, say from 60° to 120° C. in a treatment lasting only a few minutes.

Moreover, due to the rapidity of the impregnation process, the treated anode or other body only takes up a small quantity of heat, so the process is very energy efficient.

In an alternative embodiment, the operating cycle is slightly modified, by removing used treating liquid from the bottom part 15 of the chamber after releasing the sealing members 13. In this case, when the sealing members 13 are retracted, the used treating liquid flows down and is collected in the lower part of the treating chamber, in a channel or sump at the bottom of an inclined surface down which the liquid flows. The outlet 20 then leads from this channel or sump for return of the used liquid to the reservoir. Particularly when boron-based or phosphorous-based treating liquids are used, a sloping floor ensures continuous draining of the used liquid, which avoids unwanted deposits of the oxidation retardant. This simplifies maintenance of the apparatus and reduces operating costs.

Figure 2:
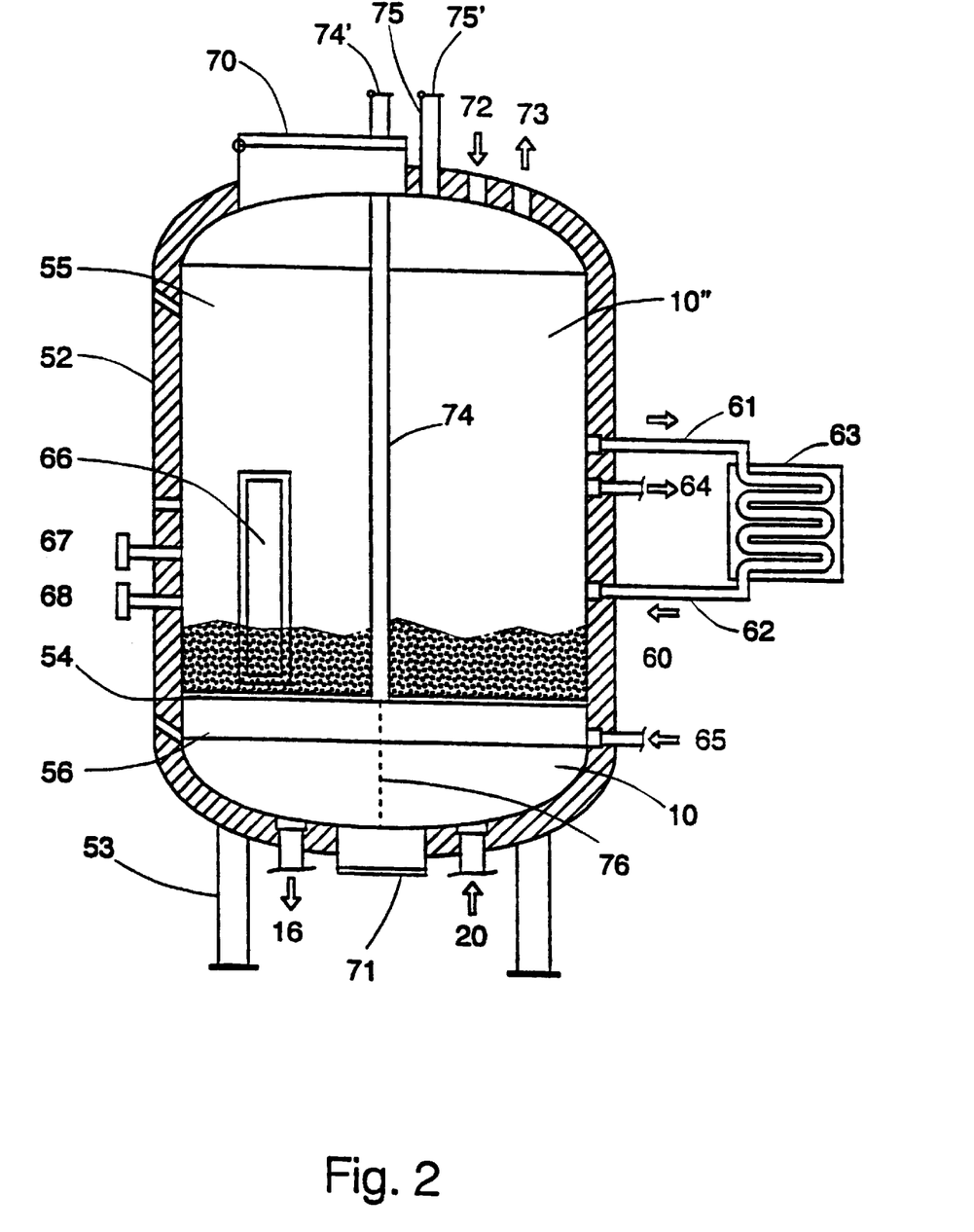
FIG. 2 is schematic cross-sectional view of a preferred type of reservoir for preparing and supplying the treating liquid.

FIG. 2 shows the main components of a very advantageous design of a storage vessel or reservoir 52 for supplying the treating liquid 10 via a supply conduit 16 and returning used treating liquid to the reservoir 52 via a return conduit 20.

Reservoir 52 is separated by a horizontal inner divider wall 54 into an upper (or first) compartment 55 and a lower (or second) compartment 56. The upper compartment 55 contains saturated treating liquid 10" at a temperature $T_1$, this saturated treating liquid 10" being in contact with a mass 60 of undissolved treating agent on the divider wall 54. The lower compartment 56 contains a supply of non-saturated treating liquid 10 which is at the same concentration as that in compartment 55 but is at a temperature $T_2$ which is higher than $T_1$.

The reservoir 52 further comprises arrangements for maintaining the hot treating liquid in the compartments 55 and 56 at the respective temperatures $T_1$ and $T_2$. As shown for compartment 55, such an arrangement comprises an outlet 61 and a return inlet 62 for circulating the hot liquid via a standard type of heat exchanger 63 which heats the circulating liquid to the desired temperature $T_1$ (or $T_2$). A similar arrangement (not shown) is provided for compartment 56. These heater/circulating arrangements also serve to stir the liquid in compartments 55 and 56. Additional stirrers can be included if desired.

Compartment 55 has an outlet 64 and compartment 56 has an inlet 65 via which hot treating liquid 10" from compartment 55 at temperature $T_1$ can be transferred into compartment 56 where the liquid is maintained at a temperature $T_2$ above $T_1$. Heating the liquid from temperature $T_1$ to $T_2$ can be done between the outlet 64 and inlet 65, or in a separate heating/circulating device (like 61, 62, 63).

The reservoir 52 also has a window 66 in one face, through which the level of the undissolved treating material 60 can be monitored. As shown for compartment 55, a thermometer 67 and a manometer 68 are provided for monitoring the temperatures $T_1$ (or $T_2$) and the pressure in the respective compartment 55 (or 56).

At the top of reservoir 52 is a hinged cover 70 which can be manually opened for tipping into the compartment 55 a fresh supply of material 60 when needed, as can be visually ascertained by inspection via window 66. The material 60 can thus be supplied at convenient times by emptying it, for example from a sack. The cover 70 is fitted with a seal to prevent the escape of fumes.

At the bottom of reservoir 52 is an optional manhole-type opening 71 that can be opened for manually removing debris etc. that may accumulate in the lower compartment 56. For this purpose, the lower compartment is fitted with a perforated dividing wall 76 for restraining the debris.

The reservoir further comprises a hot water inlet 72 and a hot water outlet 73 at the top of compartment 55. It thus possible to include, inside the main compartment 55 of the reservoir 52, an internal hot water storage tank arranged so that, when needed, the stored hot water can be used to flush the conduits 61, 62 and the heat exchanger 63 to dissolve any deposits of the treating material deposited from the saturated liquid.

Also, each of the upper and lower compartments 55, 56 has a venting device for equalizing pressure therein. This consists of a vent tube 74, which connects the compartment 56 to the outside, having a spring-actuated closure flap 74' for venting in case of excess pressure in the compartment 56. Likewise, compartment 55 has a vent tube 75 closed by a spring-actuated closure flap 75'.

The described improved reservoir 52 can be used for supplying hot treating liquid for various processes; i.e. even without using a vacuum. For instance, it can be used to spray or otherwise apply a topcoating of the treating material onto a treated body. This reservoir 52 is very advantageous from several points of view.

By maintaining the treating liquid at a given temperature $T_1$ in compartment 55, the treating material therein is maintained dissolved, at a concentration which corresponds to the saturation concentration at that temperature $T_1$. This is achieved without any complex control means and without a need to meter in selected amounts of the treating material, simply by maintaining an excess of undissolved treating material 60, by adequate stirring, and by maintaining the temperature at the desired value $T_1$. Dissolved at the same concentration as before, but is sufficiently below the saturation concentration that when the liquid is supplied for example to the upper part of chamber 14, the risk of unwanted deposition of the treating material in the supply arrangement is reduced or eliminated, compared to when a liquid at or near saturation is used. Moreover, the concentration of the treating liquid is controlled in a very simple way. The reservoir 52 can be filled manually at convenient intervals with fresh treating material 60. The simple arrangement with sealed cover 70 avoids the escape of undesirable fumes.

Instead of increasing the temperature in compartment 56, the same effect could be achieved by maintaining the treating liquid at the temperature $T_1$ and adding selected amounts of hot water at temperature $T_1$.

Instead of returning the used treating liquid into compartment 56 via the conduit 70, it could be returned into compartment 55. For certain applications of the reservoir 52, the supplied treating liquid need not be returned to the reservoir.

When a solution of boric acid is used for the treatment of the upper parts of pre-baked carbon anodes of aluminium production cells, a saturated solution of boric acid can be contained in compartment 55 at a temperature $T_1$ in the range 50° C. to 110° C., for example. The sub-saturated treating solution 10 can be obtained by heating the solution in compartment 56 to a temperature say about 10° C. to 15° C. above $T_1$. When this sub-saturated solution is impregnated into the surface of a carbon anode 11 at ambient temperature assisted by vacuum, and maintaining the external solution hot by means of the heater 31, a boron-containing layer precipitates in the pores underneath the surface of the carbon body 11. During use of the anode, the impregnated layer vitrifies and forms a dense viscous protective layer considerably reducing oxidation of the upper part of the anode which remains as an anode butt.

What is claimed is:

1. A method of treating an open-pored porous body (11) which is to be exposed to oxidising conditions or other chemical attack at high temperatures so as to protect the body against oxidation or chemical attack at said high temperatures, which method comprises:
   A) bringing into contact with the surface of the body (11) at a temperature which is about or just above ambient temperature a hot treating liquid (10) containing a dissolved treating agent at a concentration below saturation concentration, the hot treating liquid being at a temperature above the temperature of the body and the concentration of treating agent in the hot treating liquid being such that when the liquid is cooled down to the temperature of the body, the liquid saturates and the treating agent precipitates;
   B) applying a pressure differential to cause the treating liquid to impregnate into the surface pores of the body and deposit, within pores of the body (11) underneath the surface, a layer of the treating agent precipitated from the liquid inside the body by cooling as the liquid impregnates the pores of the body, and
   C) controlling said bringing into contact of the surface of the body (11) with the treating liquid (10) and applying said pressure differential so that the temperature of the body remains below the temperature of the treating liquid during the entire duration of their contact;
   said precipitated layer of the treating agent inside the body forming, when the body is exposed to said high temperatures, a protective layer in the surface pores which protects the body against oxidation or other chemical attack.

2. The method of claim 1, wherein said treating solution comprises a soluble boron compound which forms a viscous protective layer at temperatures above 400° C.

3. The method of claim 1, wherein application of the pressure differential fills said pores with treating liquid, the application of the pressure differential being continued at least until all of the pores of the part of the body being treated are filled.

4. The method of claim 1, wherein the pressure differential is applied by applying a vacuum to a part of the body out of contact with the treating liquid.

5. The method of claim 1, wherein the treating liquid is at a temperature at least 5° C. above the temperature at which the treating liquid is saturated with the treating agent.

6. The method of claim 5, wherein the treating liquid is at a temperature at least 10° C. above the temperature at which the treating liquid is saturated with the treating agent.

7. The method of claim 5, wherein the applied treating liquid is at a temperature at least 20° C. above the temperature of the body to be treated.

8. The method of claim 5, wherein the treating liquid is supplied at a temperature in the range 60° C. to 120° C.

9. The method of claim 8, wherein the treating liquid in contact with the body is maintained at said temperature in the range 60° C. to 120° C. by heating it to compensate for heat loss due to contact of the treating liquid with the body (11).

10. The method of claim 7, wherein the treated body is at a temperature in the range 20° C. to 50° C.

11. The method of claim 1, comprising supplying hot treating liquid (10) from a reservoir (32,52) to the body (11) to be treated; returning non-impregnated treating liquid after treatment back to the reservoir (32,52); and adding components of the treating liquid to the reservoir to compensate for consumption of the treating liquid in the treating process.

12. The method of claim 1 which comprises providing a saturated solution (10") of the treating agent at a given temperature ($T_1$), and deriving from said saturated solution a treating liquid comprising a non-saturated solution (10) of the treating agent.

13. The method of claim 12, wherein the treating liquid comprising said non-saturated solution (10) is derived from the saturated solution (10") by raising its temperature, the non-saturated solution containing the treating agent at the same concentration which corresponds to the saturation concentration at said given temperature ($T_1$), but being at a higher temperature ($T_2$).

14. The method of claim 1, comprising sequentially:
   a) applying hot treating liquid to the surface of the body to be treated;
   b) applying a vacuum to a part of the body not to be treated;
   c) supplying heat to treating liquid in contact with the body to compensate for heat loss due to contact of the liquid with the body;
   d) stopping the application of a vacuum; and
   e) removing non-impregnated treating liquid.

15. The method of claim 11, wherein the treating liquid contains at least one soluble compound of boron and/or phosphorous.

16. The method of claim 15, wherein the treating liquid is a boron-containing liquid based on $B_2O_3$, boric acid, tetraboric acid, or salts of said acids.

17. The method of claim 15, wherein the treating liquid contains monoaluminium phosphate, aluminium phosphate, aluminium polyphosphate, aluminium metaphosphate or a mixture thereof.

18. The method of claim 15, 16 or 17, wherein the treating liquid further contains a silicon compound such as silica or boron silicate.

19. The method of claim 1, wherein the treating liquid further contains a suspension of particulate material which assists in blocking the pores of the body and/or in the formation of the protective layer.

20. The method of claim 19, wherein said suspension contains at least one of: a colloid selected from colloidal alumina, silica, yttria, ceria, thoria, zirconia, magnesia, lithia, monoaluminium phosphate or cerium acetate; a suspension of alumina, silica, yttria, ceria, thoria, zirconia, magnesia, lithia, monoaluminium phosphate or cerium acetate; particulate refractory boride; aluminium powder, chips or cuttings; carbon powder; and mixtures thereof.

21. The method of claim 1, wherein said layer of treating agent is applied selectively to at least one part of the body, and at least one further treatment is applied to at least one other part of the body.

22. The method of claim 1, wherein at least part of said layer of treating agent is topcoated by the application of a protective material.

23. The method of claim 1, wherein the treated body is a pre-baked carbon anode (11) of an aluminium production cell.

24. The method of claim 23, wherein the anode (11) comprises a rod attached to its top face for connection of the anode to a suspension device and for electrical supply, the top part of the anode being treated with the rodded top face of the anode up.

25. The method of claim 1, wherein the treated body is part of a carbon sidewall of an aluminium production cell.

26. The method of claim 1, wherein the treated body is a carbon cathode block of an aluminium production cell.

27. An apparatus for applying a treating liquid to an open-pored porous body at a temperature which is about or just above ambient temperature, by the method of claim 1, the apparatus comprising:
   A) a reservoir (32,52) containing a supply of hot treating liquid (10) containing a dissolved treating agent at a concentration below saturation concentration, the hot treating liquid (10) being at a temperature above the temperature of the body (11) and the concentration of treating agent in the hot treating liquid being such that when the liquid is cooled down to the temperature of the body, the liquid saturates and the treating agent precipitates;
   B) a treating chamber (12) and at least one sealing member (13) arranged to be applied against a body (11) to be treated placed in the treating chamber, so as to isolate an upper part (14) of the treating chamber around the part of the body to be treated from a lower part (15) of the treating chamber around a bottom part of the body which is not to be treated;
   C) means (16,17) for supplying the hot non-saturated treating liquid from the reservoir into the upper part (14) of the treating chamber to contact the part of the body (11) to be treated;
   D) means for bringing into contact the surface of the body (11) at a temperature which is about or just above ambient temperature with the hot treating liquid (10);
   E) means (18) for applying a pressure differential to the bottom part of the body not to be treated, so as to intake an amount of the treating liquid (10) into pores in the part of the body (11) to be treated and thereby deposit, within pores of the body underneath the surface, a layer of the treating agent inside the body by cooling as it impregnates the pores of the body; and
   F) means (20,21) for removing unused treating liquid, said means D) and said means E) being arranged to control said bringing into contact of the surface of the body (11) with the treating liquid (10) and to apply said pressure differential so that the temperature of the body remains below the temperature of the treating liquid during the entire duration of their contact.

28. The apparatus of claim 27, wherein the treating chamber (12) comprises means (31) for heating treating liquid in the upper part (14) of the treating chamber to compensate for heat loss due to contact of the liquid with the body (11).

29. The apparatus of claim 27, wherein the reservoir (32) comprises means (36) for adding components of the treating liquid to the reservoir (32) to compensate for consumption of the treating liquid in the treating process.

30. The apparatus of claim 29, wherein the reservoir (52) comprises first and second compartments (55, 56), the first compartment (55) containing a reserve supply (10") of the hot treating liquid in contact with a mass (60) of the treating agent at a given temperature ($T_1$) at which the treating agent is dissolved at a concentration which corresponds to the saturation concentration at that temperature; the second compartment (56) containing a supply of non-saturated treating liquid (10) in which the treating agent is dissolved at the same concentration but at a temperature ($T_2$) above said selected temperature ($T_1$) or at the same temperature but a lower concentration, the reservoir (52) further comprising:
   (a) means (61,62,63) for maintaining the hot treating liquid in each of the first and second compartments (55,56) at the respective temperature;
   (b) an outlet conduit (16) for supplying the non-saturated hot treating liquid (10) from the second compartment (56) of the vessel to treat a body; and (c) a conduit (64,65) for supplying hot treating liquid (10") from the first compartment (55) to the second compartment (56) to compensate for consumption/loss of the treating liquid by treatment of the body.

31. The apparatus of claim 27, wherein the treating liquid contains at least one soluble compound of boron and/or phosphorous.

32. The apparatus of claim 31, wherein the treating liquid is a boron-containing liquid based on $B_2O_3$, boric acid, tetraboric acid, salts of said acids, or boron silicate.

33. The apparatus of claim 31, wherein the treating liquid contains monoaluminium phosphate, aluminium phosphate, aluminium polyphosphate, aluminium metaphosphate or a mixture thereof.

34. The apparatus according to claim 27, wherein the treating liquid further contains at least one silicon compound such as silica or boron silicate.

35. The apparaus according to claim 27, wherein the treating liquid contains a suspension of particulate material which assists in blocking the pores of the body.

36. The method of claim 35, wherein said suspension contains at least one of: a colloid selected from colloidal alumina, silica, yttria, ceria, thoria, zirconia, magnesia, lithia, monoaluminium phosphate or cerium acetate; a suspension of particulate alumina, silica, yttria, ceria, thoria, zirconia, magnesia, lithia, monoaluminium phosphate or cerium acetate; particulate refractory boride; aluminium powder, chips or cuttings; carbon powder; and mixtures thereof.

37. The apparatus of claim 27, wherein the lower part (15) of the treating chamber (12) has a sloping surface leading to a sump or channel for collecting remaining treating liquid.

* * * * *